March 1, 1932. H. D. TANNER 1,847,576
AUTOMATIC VARIABLE SPEED TRANSMISSION
Filed Feb. 19, 1930  3 Sheets-Sheet 1

March 1, 1932.    H. D. TANNER    1,847,576
AUTOMATIC VARIABLE SPEED TRANSMISSION
Filed Feb. 19, 1930    3 Sheets-Sheet 2

INVENTOR
H. D. Tanner
BY
Joseph W. Schofield
ATTORNEY

March 1, 1932.                H. D. TANNER                1,847,576
                   AUTOMATIC VARIABLE SPEED TRANSMISSION
                      Filed Feb. 19, 1930        3 Sheets-Sheet 3

R.P.M. PROPELLER SHAFT
ENGINE 2600 R.P.M.

INVENTOR
H. D. Tanner
BY
Joseph N. Schofield
ATTORNEY

Patented Mar. 1, 1932

1,847,576

UNITED STATES PATENT OFFICE

HUBERT D. TANNER, OF WEST HARTFORD, CONNECTICUT

AUTOMATIC VARIABLE SPEED TRANSMISSION

Application filed February 19, 1930. Serial No. 429,544.

This invention relates to variable speed transmissions and in particular to a transmission device which will lend itself for use in automotive vehicles between an internal combustion engine and a drive shaft for the vehicle.

An object of the present invention is to provide a transmission device which may be operated automatically by variations of motive power supplied to the driving shaft thereof so that an operator will not be required to vary the position of different gears or keys but, by merely increasing the speed of the motor and driving shaft, will apply increased driving torque to the driven shaft.

Primarily the construction is designed for automotive use, the driving shaft for the automatic transmission being directly connected to the motor of the vehicle and the driven shaft of the transmission being connected directly to the propeller shaft of the vehicle, and it is an object of importance therefore to provide a device that is simple, entirely automatic in its operation, and a device that may be applied generally to drive a shaft under widely different speed and load conditions by varying the speed and power supplied to its driving motor.

Another object of the invention is to connect the driving and driven members of a variable speed transmission device by a linkage operating under the influence of inertia or momentum and, to a limited extent, centrifugal force to vary the torque acting upon the driven member, the torque upon the driven shaft for any one device varying as a function of the rotative speed applied to the driving member.

A still further object of the invention is to provide a variable or irregular path upon the driven member for the link on the driving member, this path preferably being in the form of a closed cam constraining the link, when the driving and driven members are rotating at different speeds, to traverse about the periphery of the entire path.

A feature of importance is that the link disposed between the driving and driven members of the transmission is connected to an inertia member or fly wheel, the inertia member being adapted to increase the resistance to changes in position of this link and to vary the force exerted by the link against the cam on the driven member by which the driving torque for the driven member is effected.

Another advantage of the device which is important is that its members may be symmetrically disposed so that they may always be maintained in balance if desired; for that purpose the links may be symmetrically disposed, the cam on the driven member formed of symmetrical outline, and the links may engage corresponding portions of the cam.

With these and other objects in view my invention consists in the features of construction and operation set forth in the following specification and illustrated in the accompanying drawings.

In the accompanying drawings annexed hereto and forming a part of this specification, I have shown my invention embodied in simple forms of transmission devices designed for general application, but it will be understood that the invention can be otherwise embodied and that the drawings are not to be construed as defining or limiting the scope of the invention, the claims appended to this specification being relied upon for that purpose.

In the above mentioned drawings I have shown but two embodiments of the invention which are now deemed preferable, but it is to be understood that changes and modifications may be made within the scope of the appended claims without departing from the spirit of the invention.

Briefly, and in its broadcast aspect, my invention comprises the following principal parts: First, a housing within which are rotatably mounted driving and driven shafts preferably in alignment with each other; second, one or more links or levers pivotally mounted to revolve with the driving shaft; third, a cam fixed to the driven shaft and engaging the inner ends of the levers; and fourth, inertia members freely mounted for rotation about the axis of the driving shaft and engaging the outer ends respectively of the levers.

The invention comprises primarily a transmission of the inertia impulse type in which driving and driven co-axially mounted shafts are connected through one or more inertia members and suitable linkage including a cam. The inertia member or members turn with the driving shaft and at the same average speed. When, however, the driven shaft is turning at a slower rate than the driving shaft the inertia member or members are given an alternate acceleration and retardation in each revolution by the reaction upon the linkage by its engagement with the cam. As the cam in the embodiment selected for illustration has oppositely disposed portions there will be two accelerations and retardations for each rotation of the driving shaft relative to the driven shaft.

Figure 2:
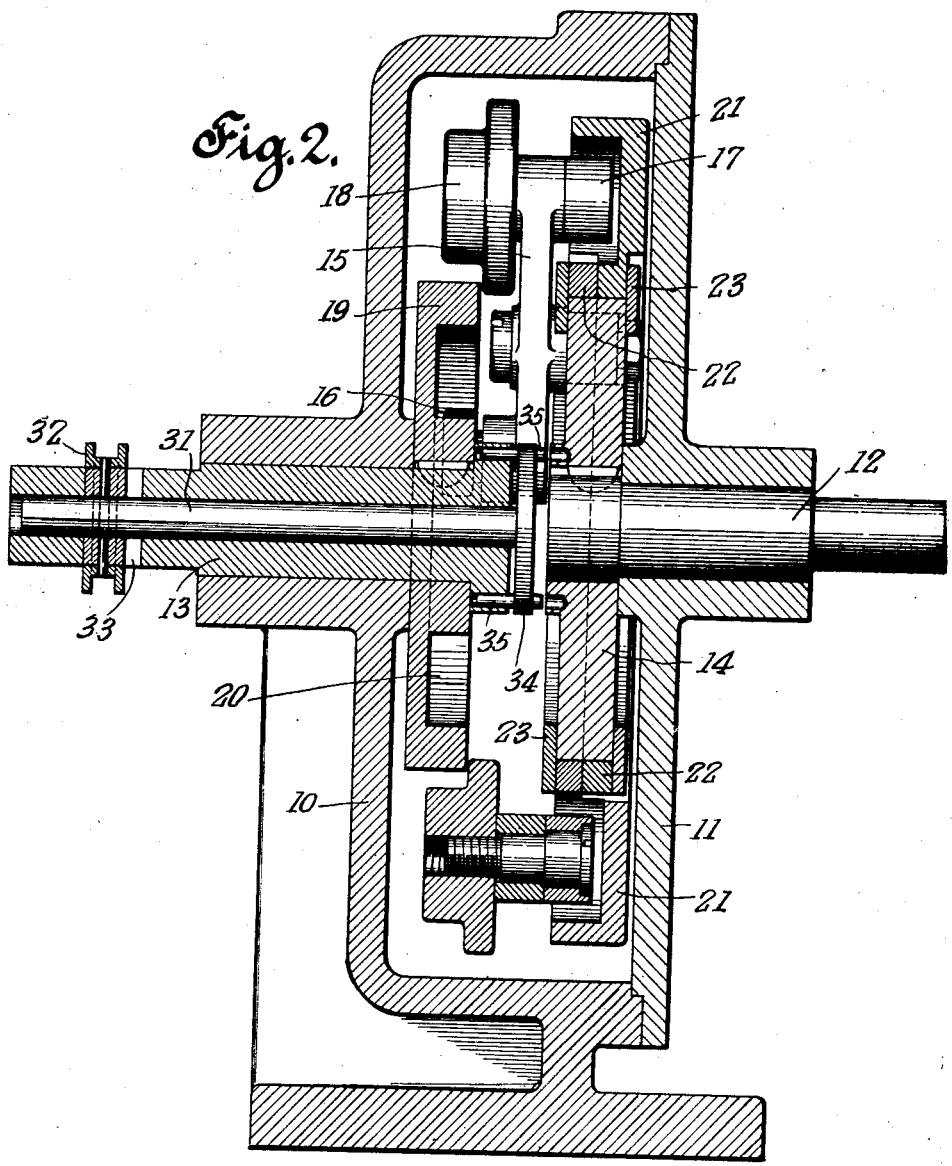
Fig. 2 is a central sectional view taken upon the plane of line 2—2 of Fig. 1.

Referring more in detail to the figures of the drawings, I provide a housing comprising a body member 10 and a closure plate 11 secured together in any suitable manner. Within the body member 10 and closure plate 11 are rotatably mounted a driving shaft 12 and a driven shaft 13, the axes of these shafts being shown in the same line, this being a preferred construction. As shown in Fig. 2, the driven shaft 13 is mounted for rotation in the body member 10 and the driving shaft 12 rotatably mounted in the cover plate 11.

Keyed to the driving shaft 12 is a disk 14 on which are pivotally mounted links or levers 15 preferably having rollers 16 on their inner ends outstanding from one side. These rollers 16 to eliminate friction may be suitably supported on anti-friction bearings. Upon the outer ends of the levers 15 are mounted rollers 17, also preferably mounted upon anti-friction bearings, and outstanding from the opposite sides of the levers 15 from the rollers 16. The levers 15 are pivoted to the disk 14 at intermediate points and weights 18 may be added at the outer ends of the levers 15 to materially overweight the portion of the lever 15 outside the pivot connection as compared to the portion within the pivot. Also, as shown in the figures of the drawings, the pivots for the levers 15 are disposed upon the disk 14 at diametrically opposite points of the disk.

On the driven shaft 13 is keyed a disk 19 within one face of which is cut a cam groove 20. As shown, the cam groove 20 is of uniform width suitable for the rollers 16 on the levers 15 to easily slide therealong when the driving and driven shafts 12 and 13 are rotating at different speeds. The shape of the cam groove 20 and its function and operation will presently be more fully described. Its outline is such that the levers 15 are oscillated slightly during operation as they are revolved with rotation of the driving shaft 12 when the driven shaft 13 and cam disk 19 are rotating at a lower speed. With this oscillation of the levers 15 retarded by their own inertia and the centrifugal action of their weighted outer ends, or by other means, the rollers 16 engaging within the cam groove 20 will tend to force the disk 19 and the driven shaft 13 around in the same direction of rotation as the driving shaft 12.

The pressure upon the cam path 20 of the rollers 16 on the levers 15 of the linkage connecting the driving and driven shafts 12 and 13 result in a positive torque and to a limited extent a negative or retrograde torque upon the driven shaft 13. The variations in torque taking place as the rollers 16 engage different portions of the cam groove 20. The cam path 20 is so shaped, however, that positive torque upon the driven disk 19 and driven shaft 13 preponderates. This torque upon the driven shaft varies with different speeds of rotation of the driven shaft. With the driven shaft 13 just beginning to turn and with the driving shaft 12 rotating at any appreciable speed, the torque upon the driven shaft 13 varies as the square of the revolutions per minute of the driving shaft 12 or slightly more. As the driven shaft 13 gathers speed this torque ratio to the speed increases.

To increase the effectiveness of the levers 15 forming the linkage between the driving and driven shafts 12 and 13 by increasing their inertia effect, the rollers 17 upon the outer ends of these levers 15 are adapted to engage inertia or fly wheel members 21, slots in the members 21 being provided for that purpose. As shown in the embodiment of the invention illustrated in the drawings, there are two inertia members 21 symmetrically disposed, one for each of the levers 15. To support the inertia members 21 for rotative movement and to prevent any radial movement they may be formed with a ring portion 22 adapted to surround the periphery of the disk 14. Side plates 23 on opposite faces of the disk 14 retain these inertia members 21 in position but permit them to oscillate individually under the influence of the oscillatory movements of the lever 15 attached respectively to them.

By means of the mounting for the inertia members 21 they are free to move rotatively relative to the disk 14 on which they are mounted but, due to the ring portion 22 maintaining the members 21 from radial movement, no centrifugal action of these members upon the levers 15 can take place. The entire influence of the members 21 upon the levers 15 is therefore that solely due to their inertia, this taking place owing to the members being alternately increased and decreased in momentary speed by oscillation of the levers 15 when different speeds of the driving and driven shaft cause the rollers 16 on levers 15 to traverse the periphery cam groove 20.

Figure 1:
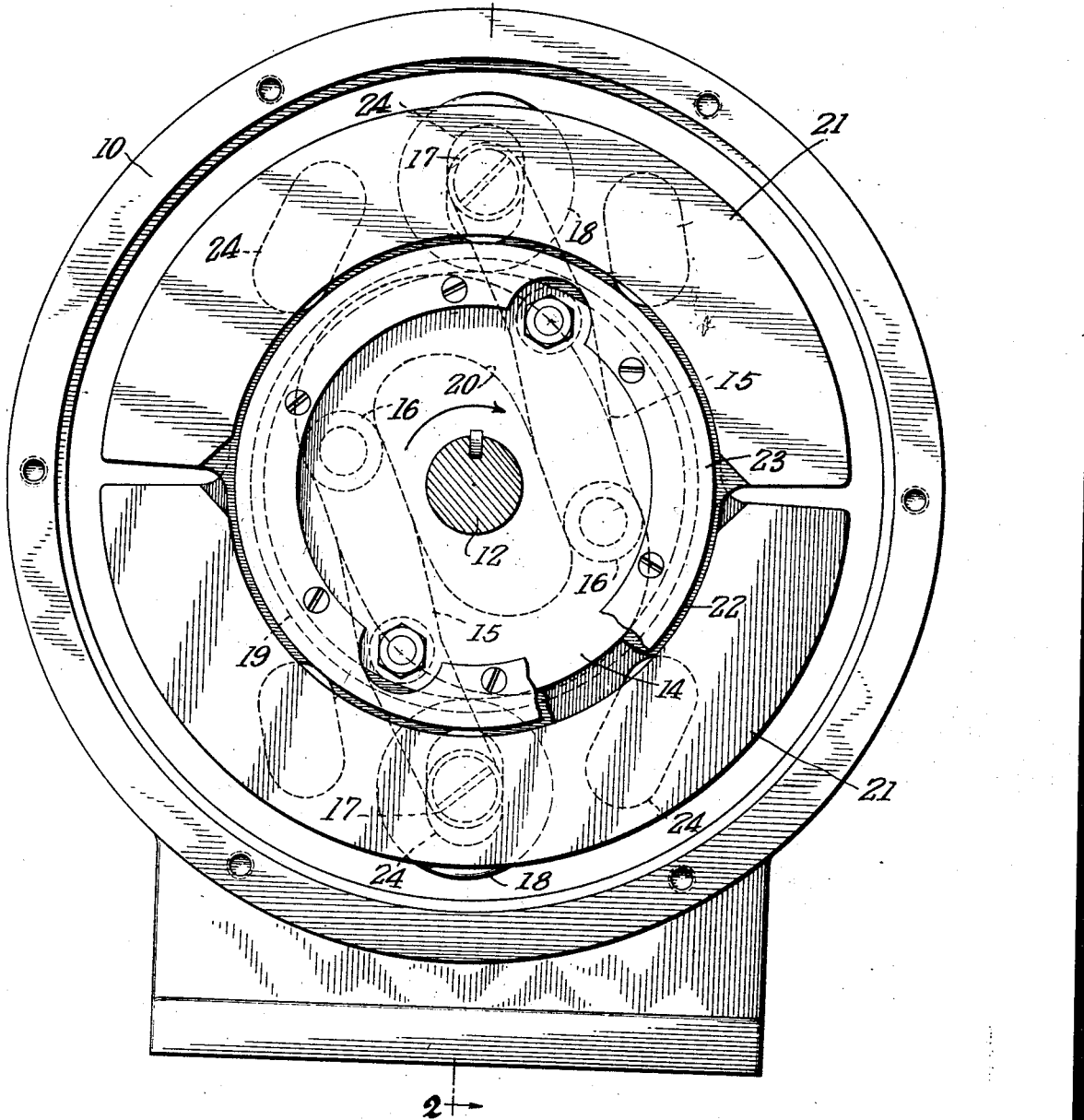
Figure 1 is a side elevation of the device with the cover upon one side of the housing removed.

In Figs. 1 and 2 of the drawings the outer ends of the levers 15 are shown engaging within their respective inertia members 21 by means of a slot 24 elongated radially. The central of three differently disposed slots 24 in each inertia member 21 is shown engaging its lever 15. It will be noted that the slots 24 for the levers 15 slope differently relatively to the arc of movement of the outer end of the lever 15. With the end of a lever 15 engaged in one of the end slots 24 the inertia member 21 will be oscillated but slightly by oscillatory movement of the lever 15. This is for the reason that the direction of the slot 24 corresponds generally to the path of movement of the roller 17. With the roller 17 at the outer end of a lever 15 engaged in the slot at the opposite end of the series, the obliquity of the slot is such that oscillation of the lever 15 oscillates its inertia member 21 through a greatly increased arc. The lever 15 is shown engaging with the central one of the series of three slots 24 which induces an intermediate amount of acceleration and deceleration of the inertia member 21 as the lever 15 is oscillated in its revolution about the cam groove 20.

In operation, as soon as the driving shaft 12 is started rotating, the rollers 16 upon the inner ends of the levers 15 tend to force the cam disk 19 to rotate by engagement of the rollers 16 against the walls of the cam groove 20. The greater the speed of rotation of the driving shaft 12 the greater the force of the levers 15 applied against portions of the cam groove and consequently the greater torque is applied to rotate the cam disk 19 and driven shaft 13. As the rollers 16 traverse different portions of the cam path 20 the torque applied to the cam disk 19 varies. In those portions where the distance from the axis of rotation increases rapidly the roller 16 is pressed most firmly against the inner wall of the cam groove 20. Where the distance of the cam groove 20 from its axis of rotation varies but little or not at all, there is very little or no torque applied to the cam disk 19 and driven shaft 13. Conversely, when the distance is decreasing, the pressure of the rollers 16 is outwardly against the outer wall of the cam groove 20 and varies with the rate of change of the distance of the cam groove 20 from its axis of revolution.

This results in a continuous transfer of energy from the driving shaft 12 to the inertia member or members 21 and back again from the inertia member or members 21 to the driving shaft. Torque is applied to the driven shaft 13 by the energy supplied to driving shaft 12 and through the linkage above described to the driven shaft 13. With the driven shaft 13 not rotating no work is done and torque is maintained without the expenditure of any more energy than that necessary to overcome friction. With the driven shaft 13 turning work is done and the energy necessary to effect this work is supplied by that applied to the driving shaft 13 and, through the linkage and cam above described, to the driven shaft.

This outline of the cam groove 20 in the disk 19 shown in Figs. 1 and 2 is of symmetrical form, two similar portions being formed on diametrically opposite sides. The levers 15 are mounted at diametrically opposite points in the disk 14 so that the rollers 16 on the levers 15 in the present embodiment engage corresponding portions of the cam groove 20 at all times. Both inertia members 21 are simultaneously oscillated as they are retarded or advanced in speed relative to the rotative speed of the driving shaft. The resulting effect of these inertia members is to provide the principal resistance to oscillatory movement of the levers 15 as their rollers 16 traverse different portions of the cam groove 20.

Figure 3:
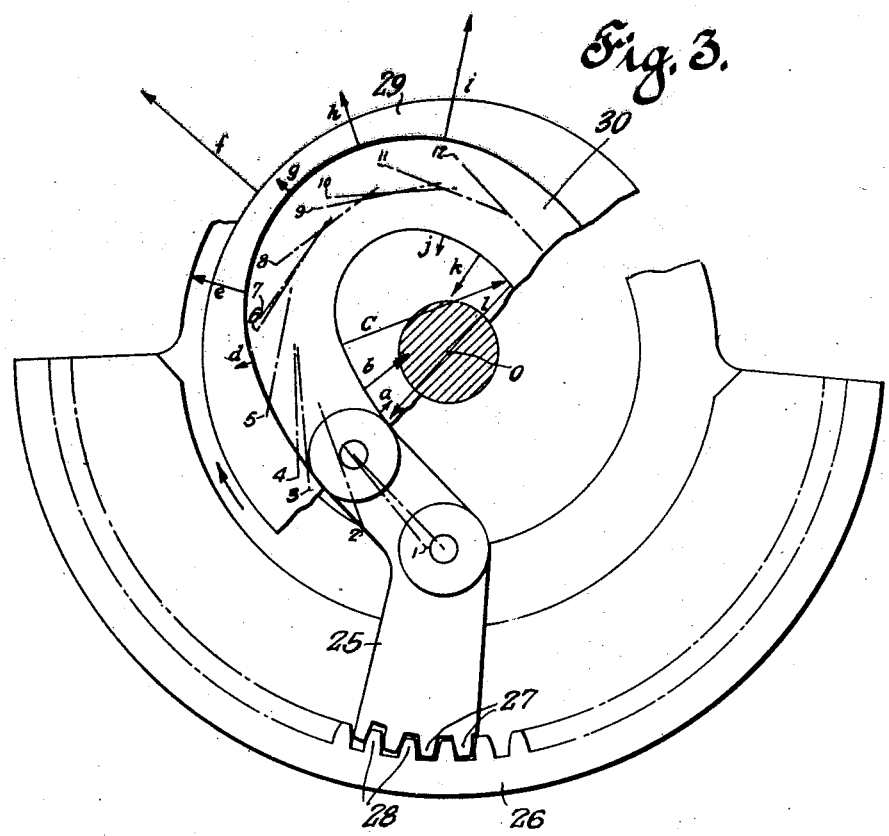
Fig. 3 is a fragmentary view of a slightly modified form of the invention.

In Fig. 3 of the drawings the attachment of the levers 25 (one only being shown) to their inertia members 26 is shown in a modified form. On the outer ends of the levers 25 are provided gear teeth 27 adapted to engage internal gear teeth 28 provided on the inertia members 26. The movements of the levers 25 will therefore induce oscillatory movements of the inertia members 26 relative to the disk 29 on which they are mounted in the same manner as the slotted engagement shown in Figs. 1 and 2.

The form of cam groove 30 shown in Fig. 3 is slightly modified from that shown in Figs. 1 and 2 but is of the type having two symmetrically disposed portions on opposite sides. In this figure the amplitude and direction of the forces effecting torque upon the cam disk 29 are indicated by arrows. Successive positions of the roller of lever 25 within the cam groove 30 are indicated by portions of circles, their enveloping surface forming the outline of the cam groove 30.

Taking a number of successive widely spaced positions of the lever 25 within the cam groove 30, as indicated by numerals 1 to 12, the corresponding forces are indicated by small letters $a$ to $l$. It will be noted that the forces $a$, $b$ and $c$ corresponding to positions of the lever 1, 2 and 3 are directed toward the center or axis of rotation $o$ and at varying distances therefrom. The force of greatest amplitude $c$ is at the greatest distance from the center o so that its moment or torque effect is a maximum in the direction to rotate the disk in the direction of the curved arrow. Positions 4, 5 and 6 having corresponding forces $d$, $e$ and $f$ effect outward pressure of the roller against the cam path. As the radius of the cam groove is increasing at these positions the torque effect upon the disk 29 is in the opposite direction, its amplitude, however, is materially less than the torque at positions $a$, $b$ and $c$. This is for the reason that the arms at which the forces $d$, $e$ and $f$ operate decrease as the forces increase in amplitude. In a similar manner the forces $g$, $h$ and $i$ at positions 7, 8 and 9 effect torque in the forward direction and forces $j$, $k$ and $l$ at positions 10, 11 and 12 effect torque in the reverse direction. The moment of the forces or torque in the forward direction, however, very materially predominates over the torque in the opposite direction.

Figure 4:
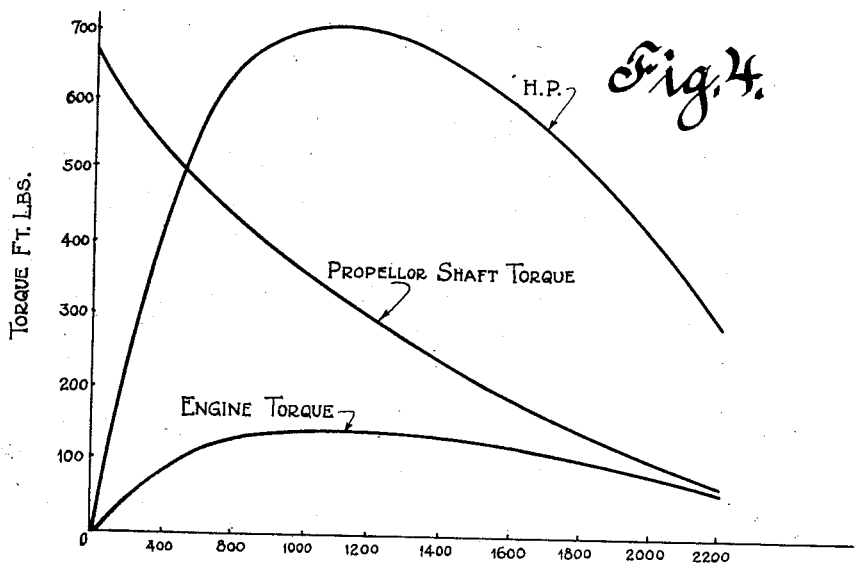
Fig. 4 is a diagram showing the operating characteristics of the device.

Fig. 4 shows in graphic form characteristics of an embodiment of the invention with the driving shaft rotating at a constant speed. In this representation of the performance of the transmission the driving shaft is assumed to be rotating at 2600 R. P. M. The varying amounts or torque applied to the driven member as this member varies in speed up to 2200 R. P. M. is represented by the curve marked "Propeller shaft torque". The horsepower transmitted by the device to the driven shaft 13 is represented by the curve indicated by letters "H. P." The torque furnished to the driving shaft 12 by the motor or engine connected thereto is represented by the curve indicated as "Engine torque".

It will be understood that the transmission device may be incorporated in various modified forms, the ones illustrated being designed primarily to explain the operation and to show how the various elements may be varied. Two cam paths only have been illustrated but others having a greater number of symmetrical portions than those shown may be employed. Similarly the number of levers may be varied, their number varying if desired from the number of lobes or symmetrical portions of the cam path. The centrifugal effect acting within the device may be varied by increasing the relative weights of the portions of the levers inside and outside of its pivotal mounting upon their disk. The inertia members may have their weight varied and also their oscillatory movement may be varied for the same movement of the levers by varying the connection between the levers and the inertia members.

To rotate the driven shaft 13 synchronously with the driving shaft 12 a tooth clutch is interposed so that the driving and driven shafts 12 and 13 may be coupled together. A clutch for this purpose is shown in Fig. 2. A rod 31 slidably mounted within the driven shaft 13 may be operated by a peripherally grooved spool 32 or collar pinned thereto, an elongated opening 33 being provided within the shaft 13 for movement of the spool 32. On the opposite end of the rod 31 is a head 34 having a plurality of pins 35 extending from opposite faces. These pins 35 are adapted to extend within openings within the driven shaft 13 on one side and the disk 14 on the opposite side. Movement of the rod 31 to its forward position therefore causes the pins 35 to enter both the driving and driven members so that they will be simultaneously and positively rotated together.

What I claim is:

1. A variable speed transmission comprising in combination, a driving shaft, a driven shaft, a cam on one of said shafts, a lever on the other of said shafts engaging said cam whereby rotation of said driving shaft will cause said lever to engage the entire periphery of said cam, and an inertia member mounted for limited rotation relative to said driving shaft and engaging said lever.

2. A variable speed transmission comprising in combination, a driving shaft, a driven shaft, a cam on one of said shafts, a lever on the other of said shafts engaging said cam at one end whereby rotation of said driving shaft will cause said lever to engage the entire periphery of said cam, and an inertia member mounted for limited rotation relative to said driving shaft and engaging said lever at its end opposite said cam.

3. A variable speed transmission comprising in combination, a driving shaft, a driven shaft, a cam on one of said shafts, a lever on the other of said shafts engaging said cam at its inner end whereby rotation of said driving shaft will cause said lever to engage the entire periphery of said cam, and an inertia member mounted for limited rotation relative to said driving shaft and engaging the outer end of said lever.

4. An automatically variable speed transmission comprising in combination, a driving shaft, a driven shaft, a cam on one of said shafts, a lever on the other of said shafts pivotally connected thereto at an intermediate point, slidable connecting means between said lever and said cam, an inertia member mounted for movement relative to said shafts, and means loosely connecting said lever and inertia member.

5. An automatically variable speed transmission comprising in combination, a driving shaft, a driven shaft, a cam on said driven shaft, a lever on said driving shaft pivotally connected thereto, connecting means between said lever and said cam, an inertia member mounted for limited rotation relative to said shafts, and means connecting said lever and inertia member whereby rotation of said driving shaft will tend to rotate said cam and driven shaft.

6. An automatically variable speed transmission comprising in combination, a driving shaft, a driven shaft, a cam on one of said shafts, a lever on the other of said shafts pivotally connected thereto at an intermediate point, a member on one end of said lever engaging said cam, an inertia member mounted for limited rotation relative to said shafts, and means loosely connecting the opposite end of said lever to said inertia member.

7. A variable speed transmission comprising in combination, a driving shaft, a driven shaft, a cam on one of said shafts, a lever on the other of said shafts engaging said cam whereby rotation of said shafts at different speeds will cause said lever to engage the entire periphery of said cam, an inertia member mounted for oscillatory movement relative to said driving shaft and engaging said lever, and means to prevent radial movements of said member.

8. An automatically variable speed transmission comprising in combination, a driving shaft, a driven shaft, a cam mounted on said driven shaft, levers pivotally mounted on said driving shaft in diametrically opposite relation to each other, means on said levers slidably engaging portions of said cam and adapted to traverse said cam upon rotation of said driving and driven shafts at different speeds, and inertia members loosely connected respectively to said levers whereby said inertia members will be individually oscillated relatively to the driving shaft upon oscillation of said levers.

9. An automatically variable speed transmission comprising in combination, a driving shaft, a driven shaft, a cam having diametrically opposite symmetrical portions mounted on said driven shaft, levers pivotally mounted on said driving shaft in diametrically opposite relation to each other, means on said levers engaging corresponding portions of said cam and adapted to traverse said cam upon rotation of said driving and driven shafts at different speeds, and inertia members loosely connected to said levers whereby said inertia members will be individually oscillated relatively to the driving shaft upon oscillation of said levers.

10. An automatically variable speed transmission comprising in combination, a driving shaft, a driven shaft, a cam mounted on said driven shaft, levers pivotally mounted on said driving shaft in diametrically opposite relation to each other, means on said levers slidably engaging portions of said cam and adapted to traverse said cam upon rotation of said driving and driven shafts at different speeds, inertia members connected respectively to said levers, and individual means for preventing radial movement of said inertia members whereby said inertia members may be oscillated relatively to the driving shaft but constrained against radial movement upon oscillation of said levers.

11. An automatically variable speed transmission comprising in combination, a driving shaft, a driven shaft, a cam on one of said shafts, a lever on the other of said shafts pivotally connected thereto at an intermediate point, slidable connecting means between said lever and said cam, an inertia member mounted for oscillatory movement relative to said shafts, means flexibly connecting said lever and inertia member, and a manually operated clutch for positively connecting said shafts for synchronous rotation.

In testimony whereof, I hereto affix my signature.

HUBERT D. TANNER.